(12) United States Patent
Soloveichik et al.

(10) Patent No.: US 8,178,231 B2
(45) Date of Patent: May 15, 2012

(54) COMPOSITION AND ENERGY STORAGE DEVICE

(75) Inventors: Grigorii Lev Soloveichik, Latham, NY (US); Richard Louis Hart, Broadalbin, NY (US); Roy Christie Galloway, Derby (GB)

(73) Assignee: General Electric Company, Niskayuna, NY (US)

( * ) Notice: Subject to any disclaimer, the term of this patent is extended or adjusted under 35 U.S.C. 154(b) by 173 days.

(21) Appl. No.: 12/565,842

(22) Filed: Sep. 24, 2009

(65) Prior Publication Data

US 2011/0070496 A1    Mar. 24, 2011

(51) Int. Cl.
*H01M 4/58*    (2010.01)
*H01M 10/39*    (2006.01)

(52) U.S. Cl. ............... 429/103; 429/218.1; 429/221; 429/223; 252/182.1

(58) Field of Classification Search ............ 429/103, 429/218.1, 221, 223, 224, 231.5; 252/182.1
See application file for complete search history.

(56) References Cited

U.S. PATENT DOCUMENTS

| | | | |
|---|---|---|---|
| 3,959,012 A | 5/1976 | Liang et al. | |
| 4,288,506 A | 9/1981 | Coetzer et al. | |
| 4,529,676 A | 7/1985 | Galloway et al. | |
| 4,592,969 A | 6/1986 | Coetzer et al. | |
| 4,797,333 A | 1/1989 | Coetzer et al. | |
| 4,891,283 A * | 1/1990 | Bowden et al. | 429/221 X |
| 4,975,343 A | 12/1990 | Coetzer | |
| 5,283,135 A | 2/1994 | Redey et al. | |
| 5,340,668 A | 8/1994 | Redey et al. | |
| 5,403,676 A | 4/1995 | Coetzer et al. | |
| 5,476,733 A | 12/1995 | Coetzer et al. | |
| 5,536,593 A | 7/1996 | Redey et al. | |
| 5,573,873 A | 11/1996 | Bugga et al. | |
| 5,604,053 A | 2/1997 | Coetzer et al. | |
| 5,972,533 A | 10/1999 | Coetzer et al. | |
| 6,939,644 B2 * | 9/2005 | Aoshima et al. | 429/223 X |

FOREIGN PATENT DOCUMENTS

| | | |
|---|---|---|
| EP | 0073877 A1 | 3/1983 |
| GB | 2164786 A | 3/1986 |
| WO | WO9423467 A2 | 10/1994 |

OTHER PUBLICATIONS

European Search Report dated Jan. 17, 2011.
Bones, R. J.; Teagle, D. A.; Brooker, S. D.; Cullen, F. L, Abstract : Development of a nickel/nickel dichloride positive electrode for a liquid sodium (ZEBRA) battery cell. Journal of the Electrochemical Society May 1989, 136, (5); 2 Pages.
J.L. Sudworth; The Sodium/Nickel chloride (ZEBRA) battery; Journal of Power Sources 100 (2001) 149-163.

* cited by examiner

*Primary Examiner* — Stephen J. Kalafut
(74) *Attorney, Agent, or Firm* — Richard A. Decristofaro (57) ABSTRACT

In accordance with one aspect of the present invention, a cathode composition is provided that includes at least one transition metal or a transition metal salt, wherein the transition metal is at least one selected from the group consisting of nickel, iron, cobalt, chromium, manganese, molybdenum, and antimony; an alkali metal halide; a salt comprising an alkali metal halide and a metal halide; and a metal polysulfide compound $MS_n$ wherein M is a metal and n is an integer equal to or greater than 2. The salt comprising an alkali metal halide and a metal halide has a melting point of less than about 300° C. An energy storage device comprising the electrode composition is also provided.

20 Claims, 4 Drawing Sheets

COMPOSITION AND ENERGY STORAGE DEVICE

BACKGROUND

The invention includes embodiments that relate to an electrode composition. The invention includes embodiments that relate to an electrode for an energy storage device.

Metal chloride batteries with molten sodium anode and beta-alumina solid electrolyte are widely employed for energy storage applications. The energy storage application may include mobile applications due to their high energy density and long cycle life. To be applicable for mobile applications like hybrid locomotives or plug-in electric vehicles (PHEV), the sodium nickel chloride battery should tolerate power surges (high currents) at both battery charging and discharging without loss in the working capacity and the cycle life. The sodium nickel chloride batteries are used because of the high theoretical energy density (790 Wh/kg) in addition to their ability to operate over a wide temperature range. The cathode of such battery is built from nickel metal, sodium chloride NaCl and a molten secondary electrolyte, NaAlCl$_4$. Nickel is present in excess, and the battery theoretical capacity is determined by the amount of NaCl. However, the practical energy density after the first full battery charge is much lower than theoretical value and cycle life of such battery is very short.

The most common way to improve the cell performance is an addition of a small amount of additives to the cathode composition. The use of sodium salts of other halogens (NaF, NaBr and NaI) and elemental sulfur as additives have been tried. However, the above approaches had disadvantages of low working capacity or, in the case of sulfur, non-uniform distribution causing high variability in the battery performance and fast degradation. Addition of iron monosulfide FeS allowed for better sulfur distribution in the electrochemical cell and less variability. However, the above electrodes containing FeS and S in combination with NaX (X=F, Br, I), were not suitable for high current applications because of low working capacity and fast cell degradation.

Therefore, there exists a need for an improved solution to the long-standing problem of high current cell performance by addition of additives for the electrode that significantly improves the cell working capacity and decreases the capacity degradation rate.

BRIEF DESCRIPTION

In accordance with one aspect of the present invention, a cathode composition is provided that includes a cathode composition that includes at least one transition metal or a transition metal salt, wherein the transition metal is at least one selected from the group consisting of nickel, iron, cobalt, chromium, manganese, molybdenum, and antimony; an alkali metal halide; a salt comprising an alkali metal halide and a metal halide; and a metal polysulfide compound MS$_n$ wherein M is a metal and n is an integer equal to or greater than 2. The salt comprising an alkali metal halide and a metal halide has a melting point of less than about 300° C.

In accordance with one aspect of the present invention, an article is provided that includes a cathode. The cathode includes at least one transition metal or a transition metal salt, wherein the transition metal is at least one selected from the group consisting of nickel, iron, cobalt, chromium, manganese, molybdenum, and antimony; an alkali metal halide; a salt comprising an alkali metal halide and a metal halide; and a metal polysulfide compound MS$_n$ wherein M is a metal and n is an integer equal to or greater than 2. The salt comprising an alkali metal halide and a metal halide has a melting point of less than about 300° C.

In accordance with one aspect of the present invention, an energy storage device is provided that includes (a) a first compartment comprising metallic alkali metal; (b) a second compartment comprising a cathode composition; and (c) a solid separator capable of transporting alkali metal ions between said first and second compartments. The cathode composition includes at least one transition metal or a transition metal salt, wherein the transition metal is at least one selected from the group consisting of nickel, iron, cobalt, chromium, manganese, molybdenum, and antimony; an alkali metal halide; a salt comprising an alkali metal halide and a metal halide; and a metal polysulfide compound MS$_n$ wherein M is a metal and n is an integer equal to or greater than 2. The salt comprising an alkali metal halide and a metal halide has a melting point of less than about 300° C.

BRIEF DESCRIPTION OF THE DRAWING FIGURES

These and other features, aspects, and advantages of the present invention will become better understood when the following detailed description is read with reference to the accompanying drawings in which like characters represent like parts throughout the drawings, wherein.

DETAILED DESCRIPTION

The invention relates generally to a cathode composition. More particularly the invention relates to a cathode composition for an energy storage device. The invention includes embodiments that relate to a method of making the energy storage device.

Approximating language, as used herein throughout the specification and claims, may be applied to modify any quantitative representation that could permissibly vary without resulting in a change in the basic function to which it is related. Accordingly, a value modified by a term or terms, such as "about" is not limited to the precise value specified. In some instances, the approximating language may correspond to the precision of an instrument for measuring the value. Similarly, "free" may be used in combination with a term, and may include an insubstantial number, or trace amounts, while still being considered free of the modified term. The singular forms "a", "an" and "the" include plural referents unless the context clearly dictates otherwise.

As used herein, cathodic material is the material that supplies electrons during charge and is present as part of a redox reaction. Anodic material accepts electrons during charge and is present as part of the redox reaction. The cathode includes cathodic materials having differing functions: an electrode material, a support structure, and a current collector. The electrode material is present in the cathode as a participating electrochemical reactant both in its oxidized or reduced state, or at some state between full oxidation or reduction. The support structure does not undergo much if any chemical reaction during the charge/discharge, but does provide electron transport and support the electrode material as the electrode material undergoes chemical reaction and allows for a surface upon which solids may precipitate as needed. An electrolyte is a medium that provides the ion transport mechanism between the positive and negative electrodes of a cell, and may act as a solvent for the oxidized form of the electrode material. Additives that facilitate the ion transport mechanism, but do not themselves provide the mechanism, are distinguished from the electrolyte itself.

"Optional" or "optionally" means that the subsequently described event or circumstance may or may not occur, and that the description includes instances where the event occurs and instances where it does not.

Furthermore, whenever a particular feature of the invention is said to comprise or consist of at least one of a number of elements of a group and combinations thereof, it is understood that the feature may comprise or consist of any of the elements of the group, either individually or in combination with any of the other elements of that group.

In one embodiment of the present invention, a cathode composition is provided that includes at least one transition metal or a transition metal salt, an alkali metal halide; a salt comprising an alkali metal halide and a metal halide; and a metal polysulfide compound. The transition metal may be at least one selected from the group consisting of nickel, iron, cobalt, chromium, manganese, molybdenum, and antimony. In one embodiment, the transition metal may be at least one selected from titanium, vanadium, niobium, molybdenum, chromium, manganese, iron, antimony, nickel, cobalt, silver, cadmium, tin, lead, or zinc. In one embodiment, the transition metal may be nickel. In another embodiment, the transition metal may be copper.

The cathode composition includes a salt comprising an alkali metal halide and a metal halide. In one embodiment, the alkali metal may be at least one selected from sodium, lithium, potassium, cesium, rubidium. In one embodiment, the alkali metal includes sodium, potassium, lithium or combinations thereof. In another embodiment, the alkali metal may be sodium.

The salt includes at least one halogen selected from chlorine, bromine, and fluorine. In one embodiment, the halogen may be chlorine.

In one embodiment, the metal halide may be at least one selected from aluminum halide, gallium halide, and tin halide. In one embodiment, the metal halide may be aluminum halide.

The salt comprising an alkali metal and a metal halide has a melting point of less than about 300° C. In one embodiment, the salt of the alkali metal and a metal halide has a melting point a range from about 300° C. to about 250° C.; from about 250° C. to about 200° C. or from about 200° C. to about 150° C.

The cathode composition may include an alkali metal halide. In one embodiment, the alkali metal halides is at least one selected from sodium chloride, sodium iodide, sodium bromide, sodium fluoride, potassium chloride, potassium iodide, potassium bromide, potassium fluoride, lithium chloride, lithium iodide, lithium bromide, lithium fluoride, cesium chloride and the like. In one embodiment, the cathode composition may further include aluminum. In one embodiment, the electrolyte composition includes a metal halide and aluminum halide in a molar ratio a range from about 1:1 to about 1:2. In another embodiment, the salt comprises sodium chloride and aluminum chloride in a molar ratio a range from about 0.53:0.48 0.45:0.55.

The cathode composition includes a metal polysulfide compound. The metal polysulfide compound has the formula MSn wherein M is a metal and n is an integer equal to or greater than 2. In one embodiment, the metal polysulfide compound has the formula MSn where n is 2. In one embodiment, the metal is at least one selected from alkali metals, and transition metals. In another embodiment, the metal is at least one selected from iron, sodium and nickel. In one embodiment, the metal polysulfide compound includes at least one selected from iron disulfide, sodium disulfide and nickel disulfide. In another embodiment, the metal polysulfide compound is iron difulfide. The iron disulfide may exist as a pyrite structure or a marcasite structure. In another embodiment, the metal polysulfide compound is sodium polysulfides of the formula $Na_2S_n$ wherein n is an integer from 2 to 5. In another embodiment, the metal polysulfide compound is sodium disulfide. In one embodiment, the metal polysulfide compound may be formed in-situ.

In one embodiment, the metal polysulfide compound is present in an amount a range from about 0.5 weight percent to about 5 weight percent, from about 1 weight percent to about 4 weight percent based on the total weight of the active cathode composition. In another embodiment, the metal polysulfide compound is present in an amount a range from about 4 weight percent to about 7 weight percent, or from about 7 weight percent to about 10 weight percent based on the total weight of the active cathode composition.

In one embodiment, the cathode composition may include other additives that may affect performance. Such performance additives may increase ionic conductivity, increase or decrease solubility of the charged cathodic species, improve wetting of the solid electrolyte by the molten electrolyte, or prevent ripening of the cathode microdomains, to name several utilities. In one embodiment, the additive may be present in an amount that is less than about 5 mole percent compared to the total combined moles of alkali metal halide, aluminum halide and zinc halide.

When the transition metal and iron compound may be loaded in the form of a preformed alloy, solid solution, composition, compound or other combination, the cell will typically, after an initial charge cycle, be ready for use. However, when the transition metal component and additive element component are loaded separately and not in any combination other than being part of a particulate mixture, the method of the invention may include taking the cell through a plurality of cell charge/discharge cycles, to activate or condition the active cathode material to cause the transition metal component and additive element component to combine together. In one embodiment, the cathode composition may include aluminum.

In one embodiment of the present invention, an energy storage device is provided that includes (a) a first compartment comprising metallic alkali metal; (b) a second compartment comprising a cathode composition; and (c) a solid separator capable of transporting alkali metal ions between said first and second compartments. The cathode composition includes at least one transition metal or a transition metal salt, wherein the transition metal is at least one selected from the group consisting of nickel, iron, cobalt, chromium, manganese, molybdenum, and antimony; an alkali metal halide; a salt comprising an alkali metal halide and a metal halide; and a metal polysulfide compound $MS_n$ wherein M is a metal and n is an integer equal to or greater than 2. The salt comprising an alkali metal halide and a metal halide has a melting point of less than about 300° C.

The device includes a housing having an interior surface defining a volume. A separator is disposed in the volume. The separator has a first surface that defines at least a portion of a first compartment, and a second surface that defines a second compartment, and the first compartment is in ionic communication with the second compartment through the separator.

The housing can be sized and shaped to have a cross-sectional profile that is square, polygonal, circular, or cloverleaf to provide maximal surface area for alkali metal ions transport; and can have a width to length ratio that is greater than about 1:10. In one embodiment, the length to width ratio is in a range of from about 1:10 to about 1:5, from about 1:5 to about 1:1, from about 1:1 to about 5:1, from about 5:1 to about 10:1, from about 10:1 to about 15:1. The housing can be formed from a material that is a metal, ceramic, or a composite; the metal can be selected from nickel or steel, the ceramic can be a metal oxide.

The ionic material transported across the separator between the anode chamber and the cathode chamber can be an alkali metal. Suitable ionic material may include one or more of sodium, lithium and potassium. The anodic material is molten during use. The first compartment or the anode compartment may receive and store a reservoir of anodic material. Additives suitable for use in the anodic material may include a metal oxygen scavenger. Suitable metal oxygen scavengers may include one or more of manganese, vanadium, zirconium, aluminum, or titanium. Other useful additives may include materials that increase wetting of the separator surface by the molten anodic material. Additionally, some additives may enhance the contact or wetting between the separator and the current collector, to ensure substantially uniform current flow throughout the separator.

The separator is an alkali metal ion conductor solid electrolyte that conducts alkali metal ions during use between the first compartment and the second compartment. Suitable materials for the separators may include an alkali-metal-beta'-alumina, alkali-metal-beta"-alumina, alkali-metal-beta'-gallate, or alkali-metal-beta"-gallate. In one embodiment, the solid separator includes a beta-alumina, a beta"-alumina, a gamma alumina, micromolecular sieve such as for example a tectosilicate, e.g. a felspar, felspethoid or zeolite for example synthetic zeolite such as zeolite 3A, 4A, 13X, ZSM-5 or the like, rare-earth silicophosphates, silicon nitride ceramic or nasicon. In one embodiment, the separator includes a beta alumina. In one embodiment, a portion of the separator is alpha alumina and another portion of the separator is beta alumina. The alpha alumina may be relatively more amenable to bonding (e.g., compression bonding) than beta alumina, and may help with sealing and/or fabrication of the energy storage device.

The separator may be stabilized by the addition of small amounts of, but not limited to lithia, magnesia, zinc oxide, yttria or similar oxides. These stabilizers may be used alone or in combination with themselves or with other materials. The separator, sometimes referred to as beta alumina separator electrolyte (BASE) may include one or more dopant.

As noted above, the separator is disposed within the volume of the housing. The separator may have a cross-sectional profile normal to the axis that is a circle, a triangle, a square, a cross, or a star. Alternatively, the separator can be about planar. A planar configuration (or with a slight dome) may be useful in a prismatic or button-type battery configuration, where the separator is domed or dimpled. Similarly, the separator can be flat or undulate. In one embodiment, the solid separator may include a shape which may be flat, undulate, domed or dimpled, or comprises a shape with a cross-sectional profile that may be an ellipse, triangle, cross, star, circle, cloverleaf, rectangular, square, or multi-lobal. The separator can be a tubular container in one embodiment having at least one wall. The wall can have a thickness; and an ionic conductivity and the resistance across the wall may depend in part on the thickness. Suitable thickness can be less than 5 millimeters. A cation facilitator material can be disposed on at least one surface of the separator, in one embodiment. The cation facilitator material may include, for example, selenium.

Optionally, one or more shim structures can be disposed with the volume. The shim structures support the separator within the volume of the housing. The shim structures can protect the separator from vibrations caused by motion of the cell during use and thus reduce or eliminate movement of the separator relative to the housing. If present, the shim structures may function as a current collector to the housing.

The energy storage device may have a plurality of current collectors including anode current collectors and cathode current collectors. The anode current collector is in electrical communication with the anode chamber and the cathode current collector is in electrical communication with the contents of the cathode chamber. Suitable materials for the anode current collector may include W, Ti, Ni, Cu, Mo or combinations of two or more thereof. Other suitable materials for the anode current collector may include carbon. The cathode current collector may be a wire, paddle or mesh formed from Pt, Pd, Au, Ni, Cu, C, or Ti. The current collector may be plated or clad. In one embodiment, the current collector is free of iron. The plurality of current collectors can have thickness greater than 1 millimeter (mm).

The second compartment includes a cathode composition which includes (i) at least one transition metal or a transition metal salt; (ii) an alkali metal halide; (iii) a salt comprising an alkali metal halide and a metal halide; and (iv) a metal polysulfide compound $MS_n$ wherein M is a metal and n is an integer equal to or greater than 2. The salt comprising an alkali metal halide and a metal halide has a melting point of less than about 300° C. The transition metal may be at least one selected from the group consisting of nickel, iron, cobalt, chromium, manganese, molybdenum, and antimony.

In one embodiment, the alkali metal may be sodium, and the separator may be beta-alumina. In another embodiment, the alkali metal may be potassium or lithium, with the separator then being selected to be compatible therewith.

A plurality of the electrochemical cells can be organized into an energy storage system. Multiple cells can be connected in series or parallel. For convenience, a group of coupled cells may be referred to as a module or pack. The ratings for the power and energy of the module may depend on such factors as the number of cells in the module. Other factors may be based on end-use application specific criteria.

In one embodiment, the energy storage device may be rechargeable over a plurality of cycles. In another embodiment, the energy storage device may be employed in a variety of applications and the plurality of cycles for recharge is dependent on factors such as charge and discharge current, depth of discharge, cell voltage limits, and the like.

Various embodiments of the energy storage system can store an amount of energy that is in a range of from about 0.1 kiloWatt hours (kWh) to about 100 kWh. One embodiment of the energy storage system has an energy-by-weight ratio of greater than 100 Watt-Hours/kilogram, and/or an energy-by-volume ratio of greater than 200 Watt-Hours/liter. Another embodiment of the energy storage system has a specific power rating of greater than 150 Watts/kilogram and/or an energy-by-volume ratio of greater than 300 Watt-Hours/lite.

Suitable energy storage system may have an application specific Power to Energy ratio of less than 10 to 1 hour$^{-1}$. In one embodiment, the specific power to energy ratio is in range from about 1:1 to about 2:1, from about 2:1 to about 4:1, from about 4:1 to about 6:1, from about 6:1 to about 8:1, or from about 8:1 to about 10:1. In other embodiments, the power to energy ratio is in range from about 1:1 to about 1:2, from about 1:2 to about 1:4, from about 1:4 to about 1:6, from about 1:6 to about 1:8, or from about 1:8 to about 1:10.

In one embodiment of the energy storage system, a controller communicates with the plurality of the cells. The controller can distribute an electrical load to select cells in a cell module in response to feedback signals indicating states for each of the cells in the cell module. The controller can perform a re-warm method in which a series of heating elements are activated in a sequence to melt a frozen portion of the energy storage device in a determined manner. In another embodiment, the controller may distribute an electrical load to select cathodic materials at determined locations within individual cells.

If present, a heat management device maintains the temperature of the energy storage system. The heat management device can warm the energy storage system if too cold, and can cool the energy storage system if too hot to prevent an accelerated cell degradation. The heat management system includes a thaw profile that can maintain a minimal heat level in the anode and cathode chambers to avoid a freeze of cell reagents.

Another embodiment of the invention provides an energy management system that includes a second energy storage device that differs from the energy storage device. This duel energy storage device system can address the ratio of power to energy in that a first energy storage device can be optimized for efficient energy storage, and a second energy storage device can be optimized for power delivery. The control system can draw from either energy storage device as needed, and charge back either energy storage device that needs such a charge.

Suitable second energy storage devices, for the power piece, include a primary battery, a secondary battery, a fuel cell, or an ultracapacitor. A suitable secondary battery may be a lithium battery, lithium ion battery, lithium polymer battery, or a nickel metal hydride battery.

EXAMPLES

The following examples illustrate methods and embodiments in accordance with the invention, and as such should not be construed as imposing limitations upon the claims. Unless specified otherwise, all the components are commercially available from common chemical suppliers such as Sigma-Aldrich (United States), Alpha Aesar, Inc. (Ward Hill, Mass.), Spectrum Chemical Mfg. Corp. (Gardena, Calif.), and the like.

Example 1

Cathode Composition

The sodium chloride (Custom Powders LTD, UK, 99.99% purity) was heat treated at 220° C. under vacuum and milled to an average particle size of 90%<75 um in a laboratory mill in a dry glove box. Nickel powder—nickel 255 (Inco Special Products, 97.9% pure, 0.6 m$^2$/g, 2.2-2.8 μm particle size), sodium chloride, aluminum powder (Alfa Aesar Item #42919, −100+325 mesh, 99.97%) and iron disulfide (Alfa Aesar, 99.9%) were cold pressed under a linear pressure of about 110-115 bar using an Alexanderwerk WP50N/75 Roll Compactor. The pressurized material was ground under a rotating mill into granules and the fraction 0.325-1.5 mm was used for the cell assembly.

Pressing of the electrode compartment powders was done in a 2 centimeter diameter, three-part, matched-die press tool. The powders were mixed in an inert-atmosphere glove box, and then loaded into the die just prior to molding. The powders were tamped down using a brass rod to create an even and uniform layer in a standard die. The pusher rod was marked beforehand to a mold height of 0.5 cm, the desired height of the molded cathode.

The die tool was loaded into a hydraulic press. Press force was manually increased until the design mold height was achieved, with maximum forces ranging from 15-100 kiloNewtons, depending on the pore-former weight fraction. After pressing, the pore former was removed from the molded disc in a vacuum oven at 150 degrees Celsius for one hour. The molded disc was cooled. The molded disc was transferred to an inert-atmosphere glove box to minimize moisture gain.

Preparation of an Electrolyte

Sodium chloride and aluminum chloride were mixed and melted together to produce sodium tetrachloro aluminate (NaAlCl4). Aluminum chloride was volatile when melted, so mixing and melting of the binary salt was done as a separate step before electrochemical cell fabrication.

Preparation of the binary salt was carried out in a nitrogen purge box to keep the materials dry. To produce a 750 gram batch of NaCl-rich (basic) sodium tetrachloro aluminate, 500 g of aluminum chloride (Sigma-Aldrich Item #294713, 99.99% reagent grade) and 250 g of sodium chloride (Sigma-Aldrich Item #204439, 99.999% reagent grade) were mixed in a 500-mL reaction vessel. The reaction vessel was sealed with a clamped lid equipped with a gas outlet that was connected to a mineral oil bubbler to relieve any pressure.

The reaction vessel containing the dry powders was heated to 330° C., which was above the melting point of the binary salt mixture. Once melted, 5-10 grams of aluminum powder (Alfa Aesar Item #42919, −100+325 mesh, 99.97% metals basis) was introduced to the molten salt. The aluminum powder, which oxidizes readily, acts to scavenge impurities present in the raw materials.

Once melted, with impurities precipitated out, the sodium tetrachloro aluminate was filtered to remove the aluminum powder and the precipitates. The molten salt was filtered through a heated (from about 200 to about 300 degrees Celsius) glass frit (25-μm minimum pore size). The filtered molten salt was collected on aluminum foil. Once the filtered molten salt has solidified, it was manually chipped into smaller pieces, then milled in a dedicated, laboratory-scale, grinding mill for 60 seconds. The sodium tetrachloroaluminate powder was stored in a glove box for use in cell fabrication as a binary electrolyte. Where needed, a portion of the sodium tetrachloroaluminate powder was combined with nickel chloride salt and sodium chloride to produce a ternary electrolyte, which was stored in a glove box for use in cell fabrication.

Preparation of Electrochemical Cell

Electrochemical cell was assembled using the hardware described as follows. Separator tubes, cylindrical or cloverleaf in shape, are produced according to known methods or are commercially obtained. Each tube is ceramic sodium conductive beta" alumina. The cylinder dimensions are 228 mm length, 36 mm internal diameter, and 38 mm outside diameter. Each ceramic separator tube is glass sealed to an alpha alumina collar to form an assembly. Each assembly is placed in a stainless steel can that is the housing to form an electrochemical cell. The can size is about 38 mm×38 mm×230 mm.

The electrode composition granules prepared using the procedure mentioned above, were placed in the cloverleaf shaped β"-alumina tube as in Examples 1-9 or cylindrical shaped β"-alumina tube as is the case in Example 10. The β"-alumina tube was preassembled with an anode chamber and a cathode current collector, and densified by vibration on a vibratory shaker in a nitrogen filled glove box. The cathode was then filled with molten sodium tetrachloroaluminate $NaAlCl_4$ under vacuum at a temperature of about 280° C. Following this, the cell was welded at a temperature of about 230° C. inside the glove box using a MaxStar Miller Welder, with UHP Argon Purge, and tested for leaks.

Cell Test Protocol

All cells were been assembled in the discharged state. Two different testing protocols were used.

Protocol A

In Protocol A, in the break-in (maiden) charge the cell was charged with about 1 Ampere hour to 2.67 Volt at a constant voltage (CV) until current I is less than about 0.5 Ampere. Prior to the cell testing at high current, ten conditioning cycles were performed: a 16 Ampere discharge until the mean cell voltage was less than 1.8 Volt or until 32 Ampere hour was discharged. This was followed by a 10 minute rest period. Following the rest period, a charge of about 10 Ampere to 2.67 Volt/cell, then a constant voltage charge until the current I was less than about 0.5 Ampere was carried out. The cells were discharged to 32 Ampere hour at a −16 Ampere rate. The cell degradation testing was done at 32 Ampere charge to 22 Ampere hour or 3.05 Volt, following this a constant voltage (CV) until 22 Ampere hour charged, −32 Ampere discharge to 22 Ampere hour or to 1.8 V, then constant voltage (CV) until 22 Ampere hour was discharged. After each 20 cycles, one characterization cycle (10 Ampere charge to 2.67 V/cell, constant voltage (CV) until current I was less than 0.5 Ampere, −16 Ampere discharge to 32 Ampere hour) was done.

Protocol B

In Protocol B, the break-in (maiden) charge was carried out at a temperature of about 330° C. according the following sequence: 80 mili Ampere (mA) current for 2 hours, 400 mA for 2 hrs, 800 mA for 2 hours, 2.75 Ampere for 8 hours, 5.5 Ampere till 2.67 Volt limit was reached, then constant voltage (CV) charge till the current limit was 0.5 Ampere. The cell testing was done at a temperature of about 300° C. Then cells were conditioned according Table 1 and were tested at 48 Ampere discharge and charge current. After each 20$^{th}$ cycle, the conditioning cycle at 16 Ampere charge and discharge current until the current limit 0.5 Ampere was performed.

TABLE 1

Parameters of the test protocol B.

| Cycle No. | Discharge | Charge |
|---|---|---|
| 1 | −16 A to 1.8 V | 10 A to 2.67 V, CV to I < 0.5 A |
| 2 | −32 A to 1.8 V | 10 A to 2.67 V, CV to I < 0.5 A |
| 3 | −48 A to 1.8 V | 10 A to 2.67 V, CV to I < 0.5 A |
| 4 | −16 A to 1.8 V | 32 A to 3.4 V, CV to I < 16 A |
| 5 | −16 A to 1.8 V | 48 A to 3.4 V, CV to I < 16 A |

TABLE 1-continued

Parameters of the test protocol B.

| Cycle No. | Discharge | Charge |
|---|---|---|
| 20x | −48 A to 1.8 V, CV until I > −16 A | 48 A to 3.4 V, CV to I < 16 A |
| 1x | −32 A to 1.8 V | 10 A to 2.67 V, CV to I < 0.5 A |

Example 1, and Comparative Example 1 (Ex. 1 and CEx. 1)

Ten cells with similar nickel-sodium chloride cathodes containing about the same amount of sulfur additive-iron disulfide $FeS_2$ (Example 1, Ex. 1) and iron monosulfide FeS (Comparative Example 1 CEx. 1) were assembled and tested according the protocol A. The cathode compositions are shown in Table 2. Example 2 and Comparative Example 2 (Ex. 2 and CEx. 2)

The cells with similar nickel-sodium chloride cathodes containing iron disulfide $FeS_2$ (Example 2) and iron monosulfide FeS (Comparative Example 2 CEx. 2) with about the same amount of total sulfur have been assembled and tested according the protocol B. The cathode compositions are given in Table 2.

TABLE 2

Cathode composition of Control and Example Cells.

|  | CEx. 1 | Ex. 1 | CEx. 2 | Ex. 2 |
|---|---|---|---|---|
| Ni, g | 140.0 | 136.2 | 136.1 | 136.9 |
| NaCl, g | 103.0 | 100.2 | 107.5 | 108.0 |
| Al, g | 2.00 | 1.95 | 1.95 | 1.96 |
| NaF, g | 5.00 | 4.86 | — | — |
| NaI, g | 1.00 | 0.97 | 0.99 | 0.99 |
| FeS, g | 4.00 | — | 3.91 | — |
| $FeS_2$, g | — | 3.89 | — | 2.60 |
| Total solids, g | 255.0 | 248.0 | 250.4 | 250.5 |
| $NaAlCl_4$, g | 115.0 | 115.0 | 125.0 | 125.0 |
| Test protocol | A | A | B | B |

Figure 1:
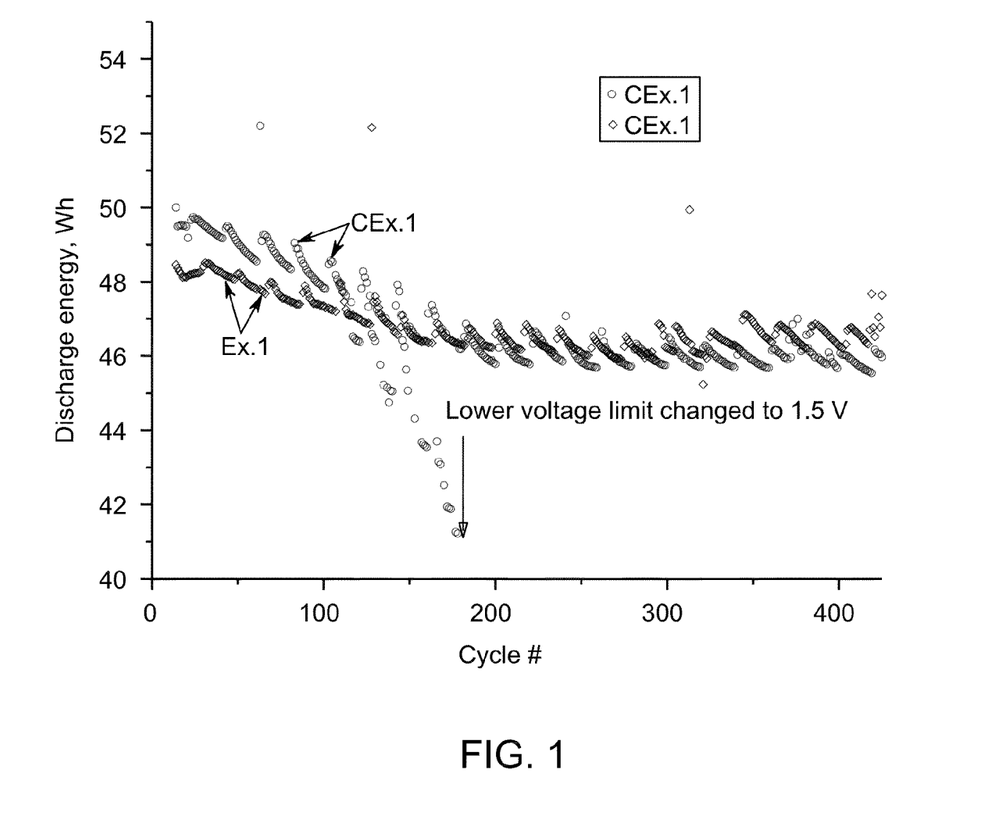
FIG. 1 is a graphical data of the constant charge cycling of cells with different cathode composition according to an example described herein.

FIG. 1 shows the constant charge cycling of cells (an average of about 10 cells) with electrode (cathode) being made from the composition of Ex. 1 and CEx. 1. As seen from FIG. 1 the cells made of the cathode composition of CEx. 1 showed a faster degradation in comparison with the cells made of the cathode composition of Ex. 1. It was also observed that to keep the constant charge at 22 Ampere hour, at some point the lower voltage limit was reduced to 1.5 Volts for the cells with CEx. 1. However, the cells having the cathode of composition of Ex. 1 were kept at the initial 1.8 Volts.

Figure 2:
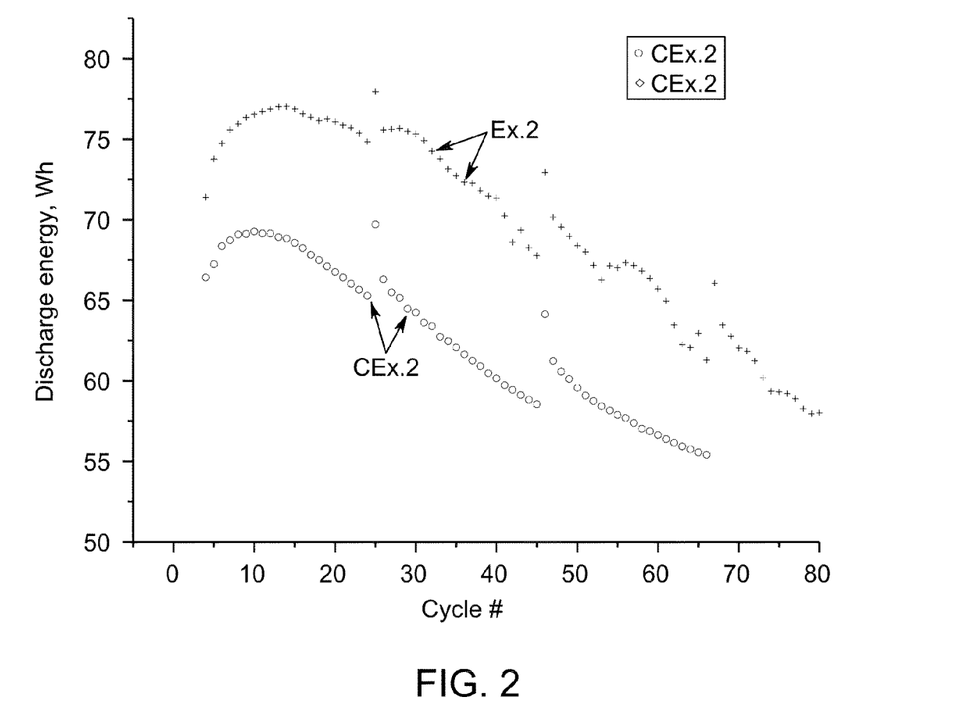
FIG. 2 is a graphical data of the discharge energy versus number of cycles at high current deep cycling of cells with different cathode composition according to an example described herein.

FIG. 2 is a plot of the cell testing results at high current (48 Ampere) deep cycling of cells with cathodes containing compositions of $FeS_2$ (Ex. 2) and FeS (CEx. 2). It was observed that the cells with $FeS_2$ (Ex. 2) containing cathode displayed higher discharge energy at the same degradation rate when compared to the cells with FeS (CEx. 2) containing cathode.

Examples 3-9 (Ex. 3-Ex. 9)

Figure 3:
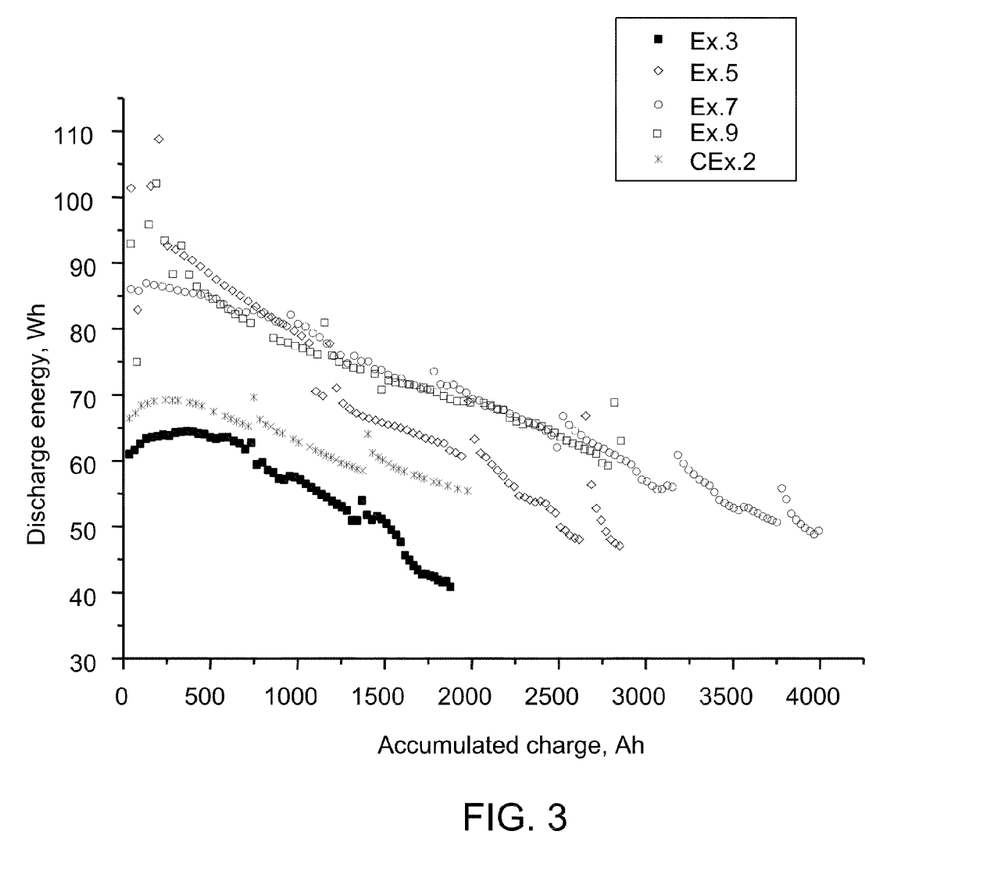
FIG. 3 is graphical data of discharge energy versus accumulated charge at high current deep cycling of cells according to an example described herein.

Electrochemical cells were assembled with cathode containing varying compositions as given in Table 3 and were tested according to the Protocol B results of the testing are shown in Table 3 and FIG. 3. It may be observed that as the amount of $FeS_2$ in the cathode composition increases, an increase in the cycling capacity is noticed (Table 3). Cathode compositions having additives such as NaI and NaF showed better stability and lesser degradation rate (Ex. 7-Ex. 9) in comparison with cathode composition having only NaF (Ex. 6).

TABLE 3

Cathode composition of cells containing FeS$_2$ and optional NaI and NaF additives and Test Result for Protocol B.

| Composition | Ex. 3 | Ex. 4 | Ex. 5 | Ex. 6 | Ex. 7 | Ex. 8 | Ex. 9 |
|---|---|---|---|---|---|---|---|
| Ni, g | 139.1 | 135.3 | 134.0 | 132.8 | 132.9 | 128.4 | 129.7 |
| NaCl, g | 108.0 | 108.0 | 108.0 | 108.0 | 108.0 | 108.0 | 104.0 |
| Al. g | 2.0 | 1.9 | 1.9 | 1.9 | 1.9 | 1.8 | 1.9 |
| NaF, g | — | — | — | 2.5 | 1.7 | 5.0 | 1.0 |
| NaI, g | — | — | 1.3 | — | 2.0 | 2.0 | 1.0 |
| FeS$_2$, g | 1.3 | 5.2 | 5.2 | 5.2 | 3.9 | 5.2 | 7.8 |
| Total solids, g | 250.4 | 250.4 | 250.4 | 250.4 | 250.4 | 250.4 | 245.4 |
| NaAlCl$_4$, g | 125.0 | 125.0 | 125.0 | 125.0 | 125.0 | 125.0 | 122.5 |
| Performance | | | | | | | |
| Maximum cycling capacity, Ah | 33.8 | 46.4 | 47.9 | 44.7 | 44.7 | 41.3 | 47.5 |
| Cathode utilization, % | 86.1 | 96.4 | 98.7 | 94.0 | 94.4 | 91.5 | 100 |
| Degradation rate, Wh/cycle | 0.41 | 0.26 | 0.41 | 0.44 | 0.32 | 0.26 | 0.38 |

FIG. 3 is a plot of the discharge energy vs. accumulated charge at high current (48 Amperes) deep cycling of cells with cathodes of compositions of Ex. 3-Ex. 9. As can be seen from in Ex. 7 with a 1.04% of FeS2 displayed better performance and full cathode utilization was reached as compared to the CEx. 2.

Example 10 and Comparative Example 3 (Ex. 10 and CEx. 3).

Figure 4:
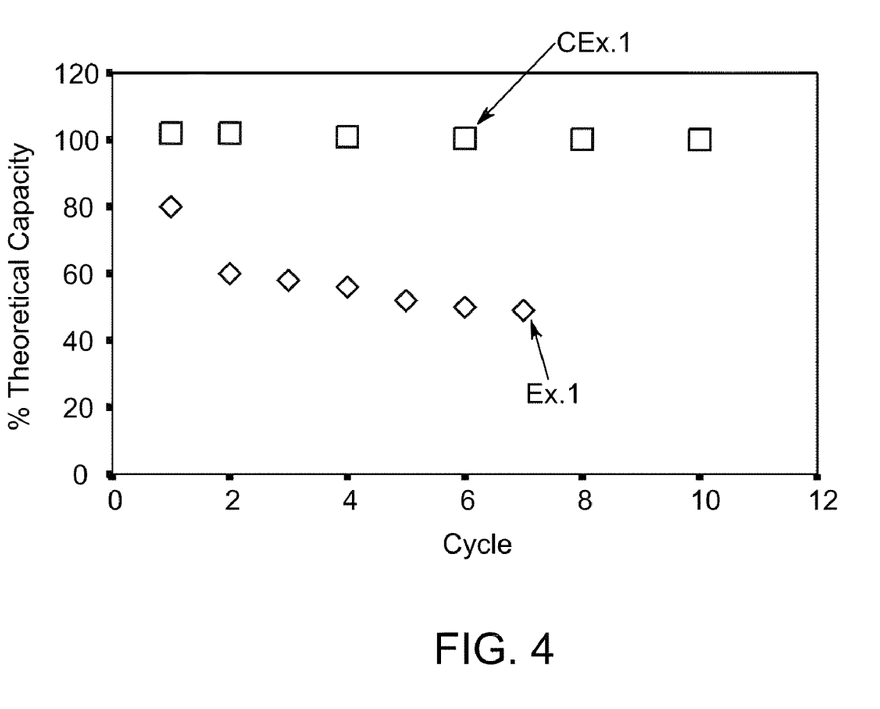
FIG. 4 is graphical data of percentage theoretical capacity retained during cycling of cells according to an example described herein.

The cells of Ex. 10 and CEx. 3 were prepared with the cathode in a beta" alumina tube with a diameter of about 30 mm and a length of about 160 mm. The CEx. 3 cathode was prepared by blending together in a small cone blender about 72.5 g nickel powder (Ni287 powder from Inco Special Products) and 47.5 g milled sodium chloride (pure dried vacuum salt, British salt Ltd UK milled to <180 microns) and dried. Following the drying, the mixture was impregnated with about 103 gram of the molten salt sodium tetrachloroaluminate. The Ex. 10 was prepared in a similar manner described for the CEx. 3 above by blending together the nickel powder and sodium chloride with about 6.0 g of finely divided iron pyrite, FeS$_2$. It was observed that the cell with the electrode of CEx. 3 showed a rapid capacity loss of more than 50% in 6 cycles (FIG. 4) while the cell with the electrode of Ex. 10 displayed a stable capacity with cycling.

Example 11 (Ex. 11)

The cathode for Ex. 11 was prepared by blending a composition of nickel powder (~138.1 g); sodium chloride (~100.1 g); Aluminum, (~2.0 g); sodium fluoride (NaF, ~2.47 g); sodium iodide (NaI, ~1.44 g); sodium disulfide (Na$_2$S$_2$, ~2.91 g); and NaAlCl$_4$, (~125.0 g) using the procedure described above. The cell was tested according Protocol A. During 180 cycles no cell degradation was observed while cells with cathode of CEx. 1 and CEx. 2 displayed a degradation rate of about 0.015 Wh/cycle.

The foregoing examples are illustrative of some features of the invention. The appended claims are intended to claim the invention as broadly as has been conceived and the examples herein presented are illustrative of selected embodiments from a manifold of all possible embodiments. Accordingly, it is Applicants' intention that the appended claims not limit to the illustrated features of the invention by the choice of examples utilized. As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges there between. It is to be expected that variations in these ranges will suggest themselves to a practitioner having ordinary skill in the art and, where not already dedicated to the public, the appended claims should cover those variations. Advances in science and technology may make equivalents and substitutions possible that are not now contemplated by reason of the imprecision of language; these variations should be covered by the appended claims.

What is claimed is:

1. A cathode composition comprising:
   at least one transition metal or a transition metal salt, wherein the transition metal is at least one selected from the group consisting of nickel, iron, cobalt, chromium, manganese, molybdenum, and antimony;
   an alkali metal halide;
   a salt comprising an alkali metal halide and a metal halide, wherein the salt has a melting point of less than about 300° C.; and
   a metal polysulfide compound MS$_n$ wherein M is a metal and n is an integer equal to or greater than 2.

2. The cathode composition according to claim 1, wherein the at least one transition metal is nickel.

3. The cathode composition according to claim 1, wherein the alkali metal halide comprises sodium, potassium, lithium or combinations thereof.

4. The cathode composition according to claim 1, wherein the salt comprising an alkali metal halide and a metal halide, comprises at least one halogen selected from chlorine, bromine and fluorine.

5. The cathode composition according to claim 1, wherein the salt comprises sodium chloride and aluminum chloride in a molar ratio a range from about 0.53:0.48 0.45:0.55.

6. The cathode composition according to claim 1, further comprises aluminum.

7. The cathode composition according to claim 1, wherein the metal polysulfide compound comprises iron disulfide.

8. The cathode composition according to claim 1, wherein the metal polysulfide compound comprises sodium polysulfides Na$_2$S$_n$ wherein n is an integer from 2 to 5.

9. The cathode composition according to claim 8, wherein the metal polysulfide compound comprises sodium disulfide.

10. The cathode composition according to claim 1, wherein the metal polysulfide compound comprises nickel disulfide.

11. The cathode composition according to claim 1, wherein metal polysulfide compound is present in an amount a range from about 0.5 weight percent to about 5.0 weight percent based on the total weight of the cathode composition.

12. The cathode composition according to claim 1, wherein the salt comprising an alkali metal and a metal halide has a melting point a range from about 150° C. to about 300° C.

13. An article comprising:

a cathode; wherein the cathode comprises:

at least one transition metal or a transition metal salt, wherein the transition metal is at least one selected from the group consisting of nickel, iron, cobalt, chromium, manganese, molybdenum, and antimony;

an alkali metal halide;

a salt comprising an alkali metal halide and a metal halide, wherein the salt has a melting point of less than about 300° C.; and a metal polysulfide compound $MS_n$ wherein M is a metal and n is an integer equal to or greater than 2.

14. The article according to claim 13 wherein the article is an energy storage device.

15. The energy storage device according to claim 13, wherein the metal polysulfide compound is at least one selected from iron disulfide, nickel disulfide, and sodium disulfide.

16. An energy storage device comprising:
(a) a first compartment comprising metallic alkali metal;
(b) a second compartment comprising a cathode composition, said cathode composition comprising:
   (i) at least one transition metal or a transition metal salt, wherein the transition metal is at least one selected from the group consisting of nickel, iron, cobalt, chromium, manganese, molybdenum, and antimony;
   (ii) an alkali metal halide;
   (iii) a salt comprising an alkali metal halide and a metal halide, wherein the salt has a melting point of less than about 300° C.;
   (iv) a metal polysulfide compound $MS_n$ wherein M is a metal and n is an integer equal to or greater than 2; and
(c) a solid separator capable of transporting alkali metal ions between said first and second compartments.

17. The energy storage device according to claim 16, wherein said device is rechargeable over a plurality of cycles.

18. The energy storage device according to claim 16, wherein said solid separator comprises a beta-alumina, a beta"-alumina, a gamma alumina, a micromolecular sieve, a silicon nitride, a silicophosphate, or nasicon.

19. The energy storage device according to claim 16, wherein said solid separator comprises a shape which is flat, undulate, domed or dimpled, or comprises a shape with a cross-sectional profile that is an ellipse, triangle, cross, star, circle, cloverleaf, rectangular, square, or multi-lobal.

20. The energy storage device according to claim 16, wherein the metal polysulfide compound is at least one selected from iron disulfide, nickel disulfide, and sodium disulfide.

* * * * *